US010955869B2

(12) United States Patent
Gharib et al.

(10) Patent No.: US 10,955,869 B2
(45) Date of Patent: Mar. 23, 2021

(54) SMART POWER MONITORING FOR WELDING AND CUTTING APPARATUS (71) Applicant: The ESAB Group Inc., Florence, SC (US)

(72) Inventors: Awad Gharib, Columbia, MD (US); Lee Mantell, Essex, MD (US)

(73) Assignee: The ESAB Group Inc., Florence, SC (US)

( * ) Notice: Subject to any disclaimer, the term of this patent is extended or adjusted under 35 U.S.C. 154(b) by 107 days.

(21) Appl. No.: 15/858,048

(22) Filed: Dec. 29, 2017

(65) Prior Publication Data
US 2018/0188765 A1 Jul. 5, 2018

Related U.S. Application Data (60) Provisional application No. 62/440,495, filed on Dec. 30, 2016.

(51) Int. Cl.
G05F 5/00 (2006.01)
G08C 19/02 (2006.01)
H02H 3/093 (2006.01)
H02H 3/00 (2006.01)
H01H 75/02 (2006.01)
B23K 9/10 (2006.01)

(52) U.S. Cl.
CPC ............... G05F 5/00 (2013.01); G08C 19/02 (2013.01); H02H 3/006 (2013.01); H02H 3/093 (2013.01); B23K 9/1006 (2013.01); H01H 75/02 (2013.01)

(58) Field of Classification Search
CPC ......... G05F 5/00; G08C 9/1006; G08C 19/02; B23K 9/1006; H01H 75/02; H02H 3/093; H02H 3/006
See application file for complete search history.

(56) References Cited

U.S. PATENT DOCUMENTS

| 5,185,705 | A | * | 2/1993 | Farrington | ............... | H02H 3/04 |
| | | | | | | 700/292 |
| 6,125,023 | A | * | 9/2000 | Bezek, Sr. | ......... | H01H 71/7409 |
| | | | | | | 361/102 |
| 6,347,025 | B1 | | 2/2002 | Ulrich et al. | | |

(Continued)

FOREIGN PATENT DOCUMENTS

| CN | 101931206 A | 12/2010 |
| WO | 2016200754 A1 | 12/2016 |

OTHER PUBLICATIONS

Notification of Transmittal of the International Search Report and Written Opinion including International Search Report and Written Opinion for PCT/US2017/068934 dated May 22, 2018.

(Continued)

Primary Examiner — Ronald D Hartman, Jr.
(74) Attorney, Agent, or Firm — Edell, Shapiro & Finnan, LLC (57) ABSTRACT An indication of a type of circuit breaker through which a powered device is connected to a power source is received at a processor. A signal from a sensor indicating a level of power flow from the power source to the powered device is received at the processor. The power flow to the powered device is altered by the processor based upon the received signal and the type of circuit breaker such that the power flow does not cause the circuit breaker to interrupt the power flow to the powered device.

17 Claims, 8 Drawing Sheets (56) References Cited

U.S. PATENT DOCUMENTS

| | | | | |
|---|---|---|---|---|
| 6,816,758 | B2* | 11/2004 | Maxwell, Jr. | G05B 19/0425 |
| | | | | 323/241 |
| 7,415,725 | B2* | 8/2008 | Henneberry | G01R 19/2513 |
| | | | | 700/286 |
| 2002/0101695 | A1 | 8/2002 | Saksa | |
| 2005/0018373 | A1* | 1/2005 | Buck | F02B 63/04 |
| | | | | 361/93.1 |
| 2007/0037441 | A1* | 2/2007 | Onstott | G01R 19/155 |
| | | | | 439/505 |
| 2011/0116196 | A1* | 5/2011 | Kellis | H02H 7/0816 |
| | | | | 361/30 |
| 2014/0268459 | A1 | 9/2014 | Robinson et al. | |
| 2016/0175966 | A1* | 6/2016 | Albrecht | B23K 9/1006 |
| | | | | 219/130.21 |
| 2016/0361777 | A1* | 12/2016 | Knoener | B23K 9/093 |

OTHER PUBLICATIONS

Examination Report No. 1 from Australian Government IP Australia for Australian Patent Application No. 2017387112 dated Mar. 20, 2020, 3 pages.

Office Action for Canadian Patent Application No. 3,046,240 dated Jul. 6, 2020, 6 pages.

Notification of the First Office Action for Chinese Patent Application No. 201780081280.5 dated Dec. 8, 2020, 12 pages.

* cited by examiner

805 — RECEIVING, AT A PROCESSOR, AN INDICATION OF A TYPE OF CIRCUIT BREAKER THROUGH WHICH A POWERED DEVICE IS CONNECTED TO A POWER SOURCE

810 — RECEIVING, AT THE PROCESSOR, A SIGNAL FROM A SENSOR INDICATING A LEVEL OF POWER FLOW FROM THE POWER SOURCE TO THE POWERED DEVICE

815 — ALTERING, VIA THE PROCESSOR, THE POWER FLOW TO THE POWERED DEVICE BASED UPON THE RECEIVED SIGNAL AND THE TYPE OF CIRCUIT BREAKER SUCH THAT THE POWER FLOW DOES NOT CAUSE THE CIRCUIT BREAKER TO INTERRUPT THE POWER FLOW TO THE POWERED DEVICE

800

SMART POWER MONITORING FOR WELDING AND CUTTING APPARATUS

CROSS-REFERENCE TO RELATED APPLICATIONS

The present disclosure claims priority to U.S. Provisional Patent Application No. 62/440,495, filed on Dec. 30, 2016, the entire contents of which are hereby incorporated by reference.

BACKGROUND

Field of the Invention

The present disclosure is related to increasing power available to an apparatus, and in particular, increasing the power available to an apparatus for a welding, cutting, or heating operation.

Related Art

In apparatus, welding or cutting power may be derived from a power circuit supplied by alternating current mains, for example. Power received from the power circuit may also be harnessed to power various components including controllers within an apparatus. In different settings, the amount of power an apparatus can draw from the power circuit may be different based on the components of the power circuit. Power circuits may include a circuit breaker component to protect other circuit components from damage resulting from too much current being drawn through the power circuit. Circuit breakers may protect the power circuits from damage by interrupting the flow of energy in the power circuit after the flow exceeds a determined level for a determined amount of time. Power circuits may employ a circuit breaker selected based on the capacity of components in the power circuit.

It is with respect to these and other considerations that the present disclosure is provided.

SUMMARY

An indication of a type of circuit breaker through which a powered device is connected to a power source is received at a processor. A signal from a sensor indicating a level of power flow from the power source to the powered device is received at the processor. The power flow to the powered device is altered by the processor based upon the received signal and the type of circuit breaker such that the power flow does not cause the circuit breaker to interrupt the power flow to the powered device.

DETAILED DESCRIPTION

Figure 1:
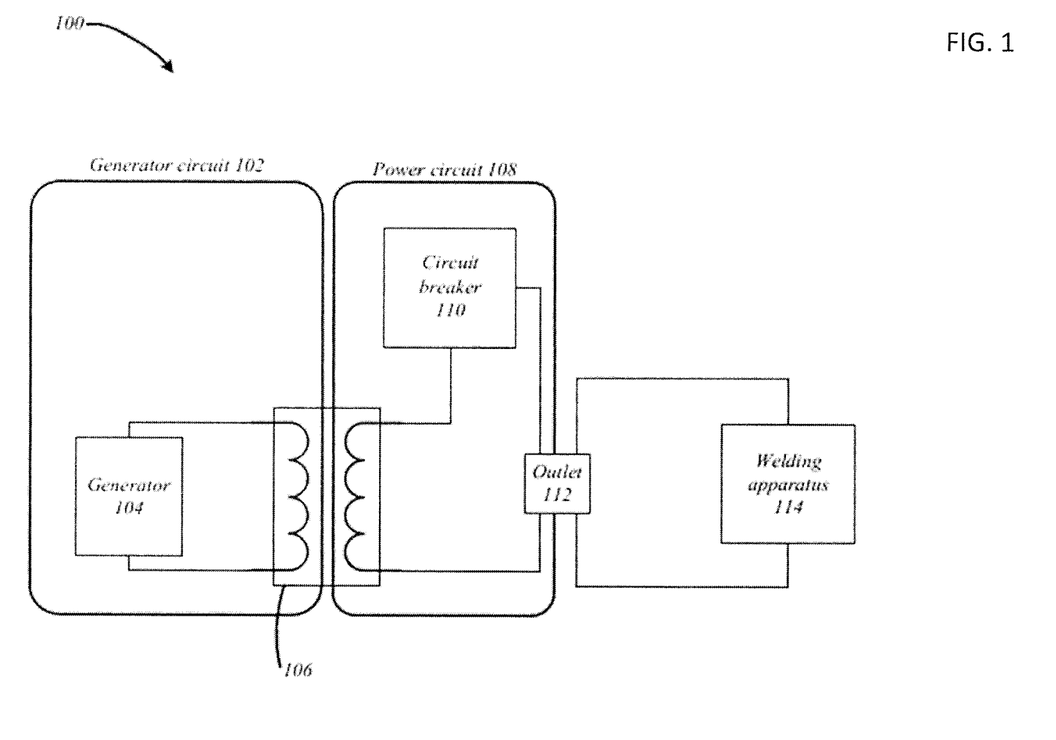
FIG. 1 depicts a block diagram of an exemplary system for smart power monitoring according to embodiments of the disclosure.

With reference now made to FIG. 1, depicted therein is a block diagram of an exemplary system 100 for powering an apparatus 114 according to embodiments of the disclosure. The system 100 may include generator circuit 102, power circuit 108, and apparatus 114. Generator circuit 102 may serve as a power source, providing a source of alternating current (AC) power to apparatus 114 via power circuit 108. Embodiments are not limited to this context. Apparatus 114, which is embodied as a welding apparatus in the present example, is configured to provide smart power monitoring according to the techniques described herein.

The generator circuit 102 may include generator 104 for converting mechanical energy into electrical energy for use in an external circuit such as power circuit 108 to power an electrical device such as apparatus 114. In some embodiments, generator circuit 102 may include power distribution components, such as AC mains, for instance. Generator circuit 102 may supply electrical power to power circuit 108 via coupling 106. In various embodiments, coupling 106 includes a one or more inductors such as in a transformer. In various such embodiments, coupling 106 may include an isolation transformer to electrically isolate apparatus 114 from generator circuit 102. In some embodiments, coupling 106 may alter the waveform of electrical power transferred between the generator circuit 102 and the power circuit 108.

Power circuit 108 may supply power received from generator circuit 102 to apparatus 114. In some embodiments, power circuit 108 may include a power supply circuit in a residential or commercial building. Power circuit 108 can include circuit breaker 110 and outlet 112. Circuit breaker 110 may operate to protect power circuit 108 from damage resulting from excess electrical power being drawn through power circuit 108 by apparatus 114, for example. Circuit breaker 110 may interrupt power circuit (i.e., create open circuit condition) after the power flow through power circuit 108 exceeds a determined level for a determined amount of time. In some embodiments, the circuit breaker may be selected based on the capacity of various components (e.g., wiring, outlets, junctions, inductors, etc.) of power circuit 108. An amperage rating associated with circuit breaker 110 may indicate the maximum amount of power, including a safety factor, which power circuit 108 can handle without tripping circuit breaker 110. Outlet 112 may enable apparatus 114 to couple with and receive power from power circuit 108. In accordance with embodiments of the disclosure, when the apparatus 114 is coupled to outlet 112, the apparatus 114 may adjust operation, such as power level based upon the amperage rating associated with circuit breaker 110.

In practice, circuit breaker 110 is tripped when the power through circuit breaker 110 exceeds a threshold value for a particular period of time. If circuit breaker 110 is rated at 20 amps, accounting for the safety factor, the circuit breaker 110 may actually be able to provide power at 22 amps for 2 minutes before tripping. For example, some circuit breakers operate using a bi-metal strip as part of circuit that passes through the circuit breaker. The metal strip will bend as it heats in response to different expansion ratios of the two metals used in the strip. If the current passing through the circuit breaker sufficiently heats the strip, the strip will bend sufficiently to break the circuit. Yet, this required heating is not instantaneous, and the circuit may utilize more current than the rating of the circuit for a short enough period of time. Accordingly, it is possible for a powered device, such as a welding apparatus 114, to draw more current, and therefore, more power through circuit breaker 110 than circuit breaker 110 is specifically rated for, so long as the average power over time is insufficient to trip circuit breaker 110.

Such an increase in power is particularly beneficial to cutting and welding apparatuses, and in particular, cutting and welding apparatuses used in exterior or residential areas with 120V power circuits. Many cutting, welding and/or heating operations require high power demands for high or even adequate performance cutting, welding and/or heating operations. In order for cutting, welding and/or heating apparatuses (sometimes referred to herein as simply welding and/or cutting apparatuses or welding apparatuses) to operate without tripping circuit breakers in 120V environments, related art devices assume a low rating for the power source, for example, a power circuit with a 15 A breaker, and power the welding apparatus so that the 15 A breaker will not be tripped. While this ensures that welding apparatuses will not trip the breaker, it also results in decreased performance. Furthermore, the assumption of a 15 A breaker may be a bad assumption, as some 120V environments have circuits rated for 20 A or 30 A. Yet, if this assumption is not made in related art apparatuses, the apparatuses may provide improved performance, but could also trip breakers when connected to power circuits with 15 A circuit breakers. The tripping of circuit breakers is particularly problematic in exterior working environments where the location of the circuit breaker may not be readily known or easily found by the operator of the welding apparatus. There is a current commercial demand for welding apparatuses that overcome these limitations. The techniques described herein provide for systems, apparatuses and methods that may overcome these limitations in example embodiments.

Figure 2:
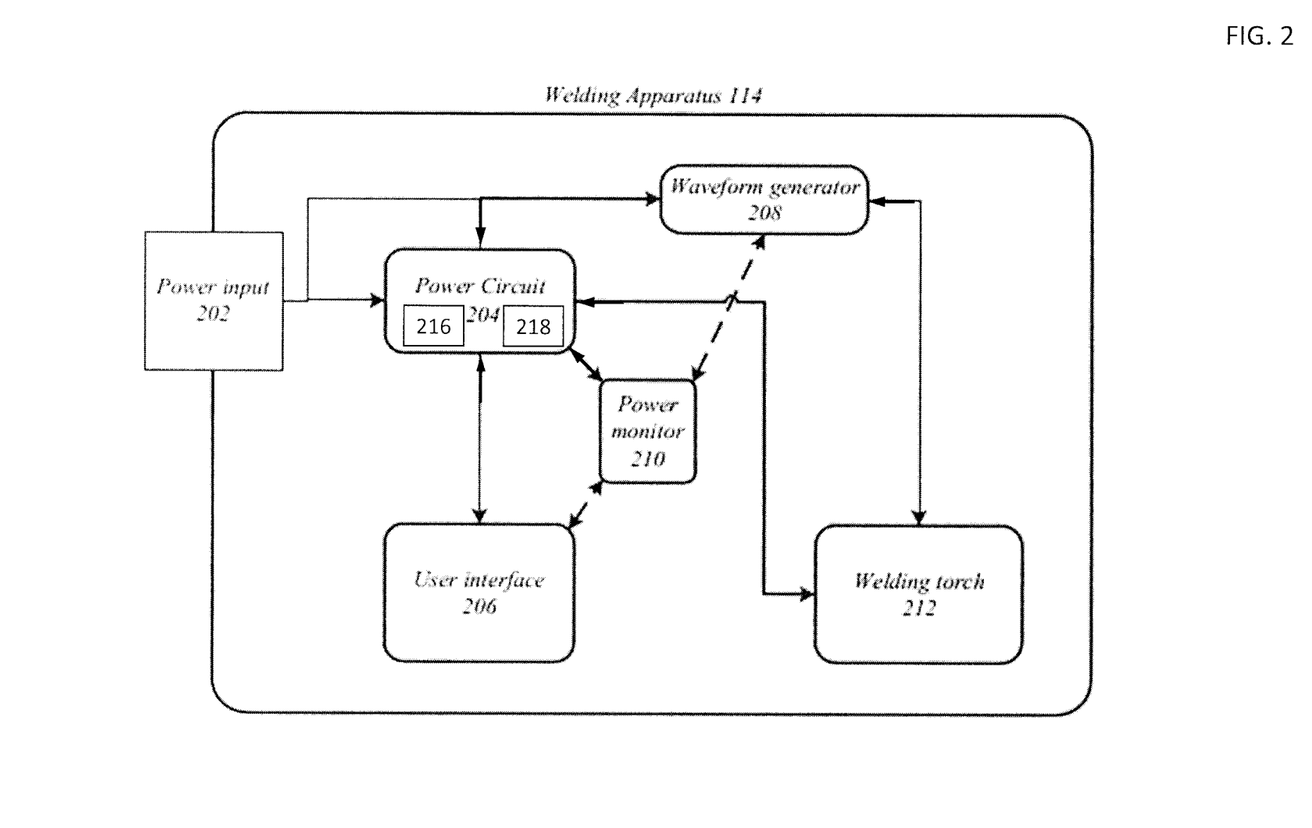
FIG. 2 depicts a block diagram of an apparatus configured to provide smart power monitoring according to embodiments of the disclosure.

FIG. 2 depicts a block diagram of an exemplary apparatus 114 according to embodiments of the disclosure. The apparatus 114 may include power input 202, power circuit 204, user interface 206, waveform generator 208, power monitor 210, and welding torch 212. The components of apparatus 114 may enable apparatus 114 to exceed the rated power level of a power source input through power input 202, such as power circuit 108 of FIG. 1, for a determined amount of time without tripping, for example, circuit breaker 110 of FIG. 1. Assuming, for example, that power input 202 is connected to a power source with a 20 amp circuit breaker, apparatus 114 may be configured to intermittently increase its power draw to 22 amps for 1.5 minutes, thereby increasing the power available for a welding or cutting operation. Embodiments are not limited in this context.

Power input 202 may electrically couple apparatus 114 to power circuit 108. In some embodiments, power input 202 may include a plug for connecting to outlet 112. Power circuit 204 may transform power received via power input 202 to provide welding or cutting power and auxiliary power to one or more components of the apparatus 114. In the illustrated embodiment, power circuit 204 may provide primary power to welding torch 212 and waveform generator 208, and auxiliary power to user interface 206 and power monitor 210. Primary power may be used by apparatus 114 to facilitate a welding, cutting, or heating operation. The power circuit 204 may include known components such as input rectifiers, converter, inverter, transformer, output circuitry, or other components to generate and deliver welding power to the welding torch 212. Waveform generator 208 may generate an electrical waveform that varies the level of power delivered to the welding torch 212 as a function of time, as detailed below. In some embodiments, the waveform generator 208 may be included in the power circuit 204. Power monitor 210 may control the magnitude and duty cycle of the waveform created by waveform generator 208.

Control by power monitor 210 may be based on input received via user interface 206. User interface 206 may include a graphical user interface displayed on an electronic display, such as a liquid crystal display, a thin film transistor display, a cathode ray tube display, or a heads-up display, for example. In some embodiments, user interface 206 may include a series of knobs, switches, buttons, or other input devices, such as computer mice and/or keyboards, which may be used in conjunction with an electronic display or LED lights. According to other embodiments, user interface 206 may be embodied as a touchscreen display. User interface 206 may allow a user to input an amperage rating for a circuit breaker, for example, 15 A, 20 A, or 30 A. In some embodiments, 16 A and 32 A rated circuit breakers may be included. According to other example embodiments, user interface 206 may permit a user to select an image indicative of the outlet through which power input 202 connects to a power source, such as power circuit 108 of FIG. 1, as the shape of the outlet may be indicative of power rating associated with the power source. A more detailed example embodiment of such a display is described below with reference to FIG. 6.

In some embodiments, power monitor 210 may be configured with a sensor to detect the input voltage to welding apparatus 114 from, for example, power circuit 108 of FIG. 1. The detection of the input voltage may determine whether apparatus 114 is connected to a 120V or 230V power source. Detection may be performed using a sensor for determining an input current, or through a sensor (e.g. magnetic or RFID) that is configured to detect a type of plug or outlet that is being used. Once detection is complete, welding apparatus may modify the user interface 206 based upon such detection. For example, the welding apparatus 114 may be a multi-voltage welder where a range of AC input voltages may be used for welding power, such as 230V and 120V. Depending on the detection of the input voltage, the subsequent operations of power circuit 204, power monitor 210, user interface 206, waveform generator 208 and welding torch 212 may all be altered.

For example, upon detection of a 230V power source, a determination may be made that smart power monitoring according to the techniques described herein is unnecessary. Accordingly, welding torch 212 may be operated via waveform generator 208 in a high power mode without fear of tripping a circuit breaker in the power source. On the other hand, if a 120V power source is detected, power circuit 204, power monitor 210, user interface 206, waveform generator 208 and welding torch 212 may all be operated according to the smart power monitoring techniques described herein.

A given 120V outlet may have one or more associated circuit breakers with an amperage rating (e.g., 15 A, 20 A, or 30 A). In some embodiments, power monitor 210 may cause user interface 206 to prompt a user for the amperage rating when 120V is detected. In some embodiments, a prompt may always be displayed to the user using user interface 206. Further, a user may be able to set a default amperage rating within user interface 206, which may be stored in a memory of apparatus 114. When a default rating is stored within memory of apparatus 114, a prompt may not be shown to user using user interface 206.

In some embodiments, this user-provided rating may include the amperage rating of a circuit breaker, such as circuit breaker 110 of FIG. 1. Accordingly, when the power monitor 210 detects that apparatus 114 is connected to a 120 V AC supply, power monitor 210 may prompt a user via user interface 206 to supply the amperage rating of power source, which may correspond to, for example, the amperage of circuit breaker 110 of power circuit 108 of FIG. 1. The amperage rating of the power source may then be received by power monitor 210 via user interface 206. Based on the received amperage rating, power monitor 210 may adjust one or more aspects (e.g., magnitude, duty cycle, etc.) of the waveform generated by waveform generator 208, which in turn alters the power delivered to the welding torch 212 by power circuit 204. Similarly, the adjustments to the waveform may be performed by waveform generator 208. These adjustments can increase the power available to apparatus 114 for a welding, cutting, or heating operation, as will be described in greater detail below.

In order to process the signals generated by power monitor 210 and appropriately adjust the waveform generated by waveform generator 208, one or more of the elements of apparatus 114 may be embodied with one or more processors 216 in communication with memory devices 218 via a bus. The processor or processors 216 may be embodied as general purpose microprocessors (e.g., central processing units (CPUs)), special purpose logic devices (e.g., application specific integrated circuits (ASICs)), configurable logic devices (e.g., simple programmable logic devices (SPLDs), complex programmable logic devices (CPLDs), field programmable gate arrays (FPGAs)) and/or digital signal processors. These processors are individually, or collectively, types of processing circuitry. The one or more processors 216 and the memory devices 218 of the present disclosure may be located in one device or distributed across multiple devices, including power monitor 210, as illustrated, and/or waveform generator 208.

The memory devices 218 of the present disclosure may be embodied as one more transitory or non-transitory storage media. These storage devices may include random access memory (RAM) or other dynamic storage devices (e.g., dynamic RAM (DRAM), static RAM (SRAM), and synchronous DRAM (SD RAM)). The memory devices 218 may also be embodied as read only memory (ROM) or other static storage devices (e.g., programmable ROM (PROM), erasable PROM (EPROM), and electrically erasable PROM (EEPROM)). Finally, the memory devices 218 may be embodied as a magnetic hard disk, and a removable media drive (e.g., floppy disk drive, read-only compact disc drive, read/write compact disc drive, compact disc jukebox, tape drive, and removable magneto-optical drive). The memory devices 218 may store information and instructions (e.g., software) that when executed by the processors 216 cause the processors 216 to carry out the techniques described herein. For example, as discussed above, a circuit breaker with a rating of 20 A may operate at 22 A for two minutes. These values may be stored in the memory devices 218 and utilized by the processing circuitry when determining how to alter the power received by, for example, a welding device. Similarly, algorithms or data tables that dictate how to alter the power received by the welding device may be stored in the memory devices and utilized by the processing circuitry.

Figure 3:
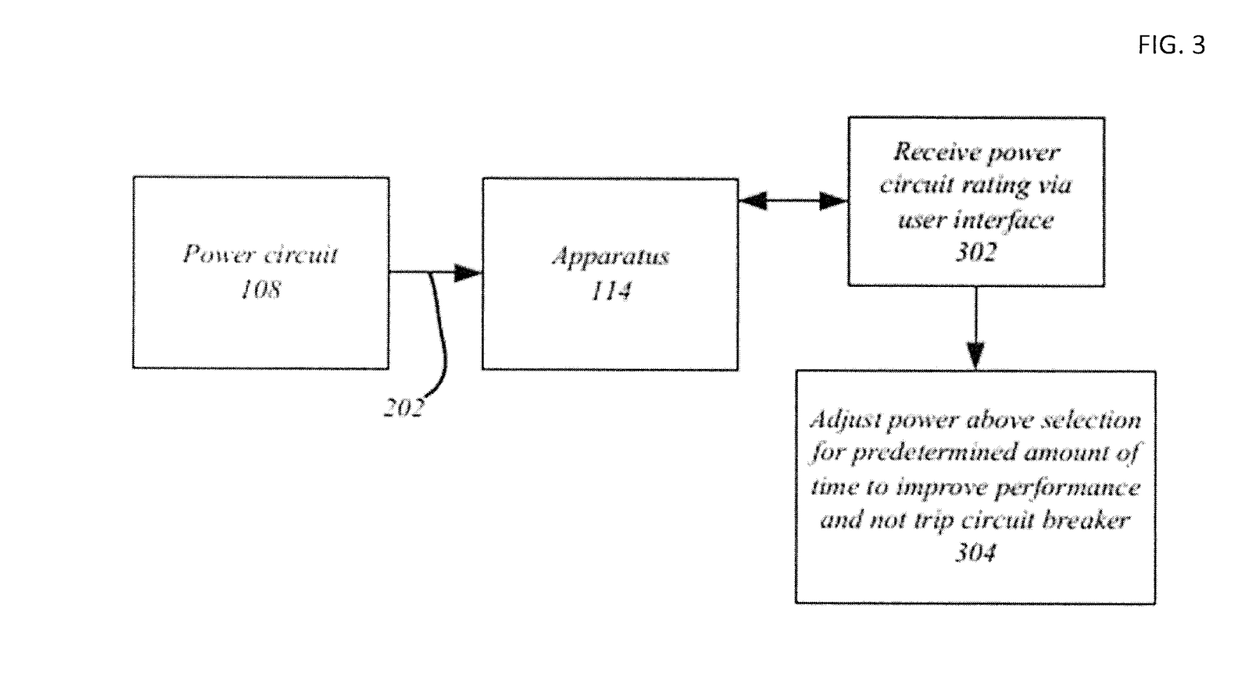
FIG. 3 illustrates an example process flow for smart power monitoring according to embodiments of the disclosure.

FIG. 3 is a composite diagram that illustrates an example process flow for utilizing a power monitor of an apparatus according to embodiments of the disclosure. Apparatus 114 may be connected to power circuit 108 via power input 202 to receive power for welding, cutting, or heating operations. At 302 an amperage rating may be received via user interface 206. In some embodiments, the amperage rating may include the amperage rating of a circuit breaker such as 15 A, 20 A, or 30 A. At 304, based on the received amperage rating, power monitor 210 may adjust power draw by the apparatus 114 above the received amperage rating for a predetermined amount of time to improve performance while not tripping circuit breaker 110. As noted above, apparatus 114 may include one or more non-transitory computer-readable storages mediums, or memories, that are capable of storing data with respect to the amperage ratings of various circuit breakers. Based upon this data, apparatus 114 may determine that power may be adjusted above a given amperage rating for periods of time without tripping the circuit breaker. Embodiments are not limited in this context.

Figure 4:
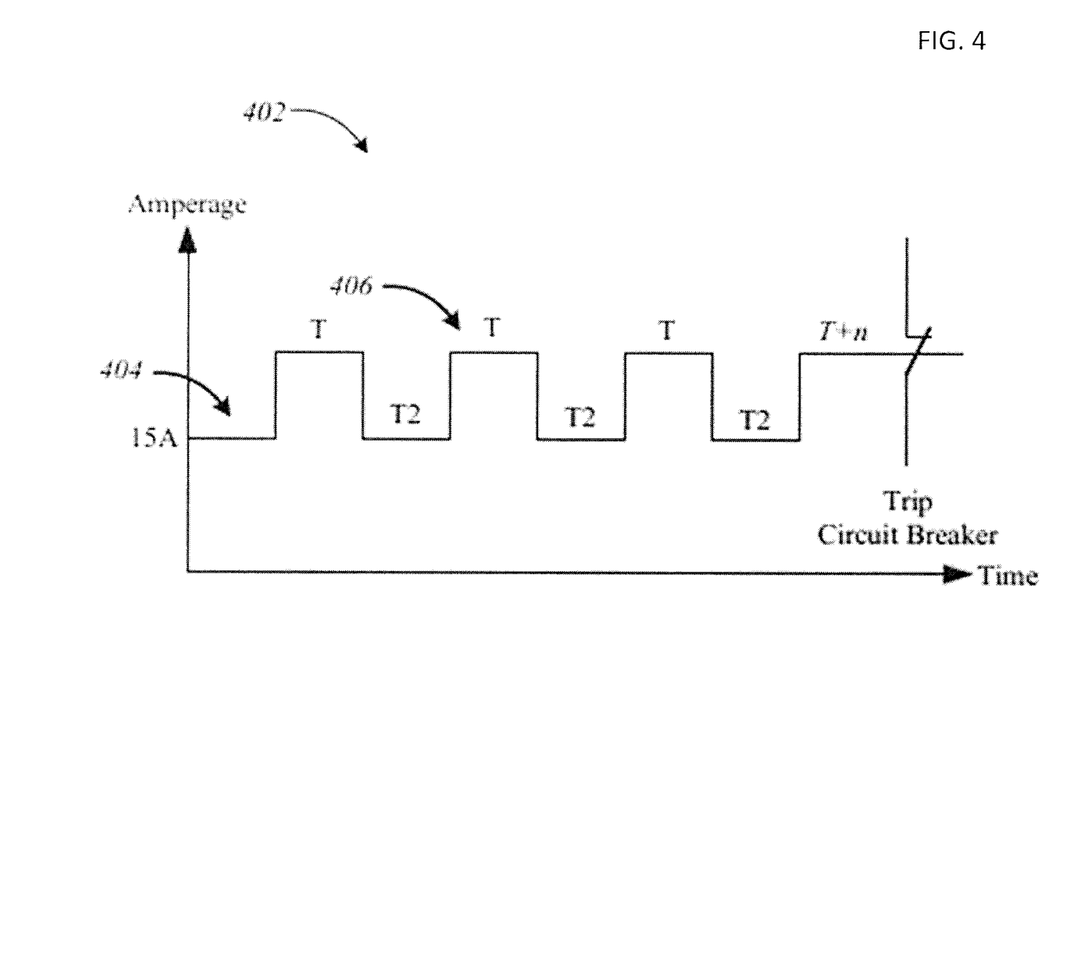
FIG. 4 depicts a first exemplary power waveform of an apparatus according to embodiments of the disclosure.

FIG. 4 depicts an exemplary welding power waveform 402 of an apparatus according to embodiments of the disclosure. In the illustrated embodiment, 'T' can represent a determined amount of time that the waveform 402 exceeds the amperage rating of power circuit 108 and 15 amps is the amperage rating of power circuit 108. If 'T' exceeds the rating for more than the determined amount of time (i.e., 'T'+'N'), then circuit breaker 110 may trip and interrupt the flow of power to apparatus 114. Accordingly, in one example, the power monitor 210 in conjunction with the waveform generator 208 of FIG. 2 may generate a waveform 402 based on the amperage rating of the circuit breaker 110 in the following manner. A lower current portion 404 of the waveform 402 may be set at 15 A while a higher current portion 406 is set at 18 A, for example. The time T may be set according to a calculated or predetermined duration where operation at 18 A, for example, does not trip a 15 A circuit breaker. The time T may be stored in the memory devices discussed above, or calculated based upon information or algorithms stored in the memory devices using the processing circuitry discussed above. In addition, the duty cycle for higher power operation may be set so that average power over time does not trip a 15 A circuit breaker. In other words, considering the time T2 of the waveform 402 where current is limited to 15 A, T/(T+T2) may be set below a threshold calculated to trip the 15 A circuit breaker. The example embodiment of FIG. 4 represents a simple system that ensures that the circuit breaker in the power source for a powered device is not tripped. Embodiments are not limited in this context. As will be discussed in conjunction with FIG. 5, the smart power monitoring of the present application may be more dynamic than that illustrated in FIG. 4, and taking into consideration the real-world use of a powered device, such as a welding or cutting device.

Figure 5:
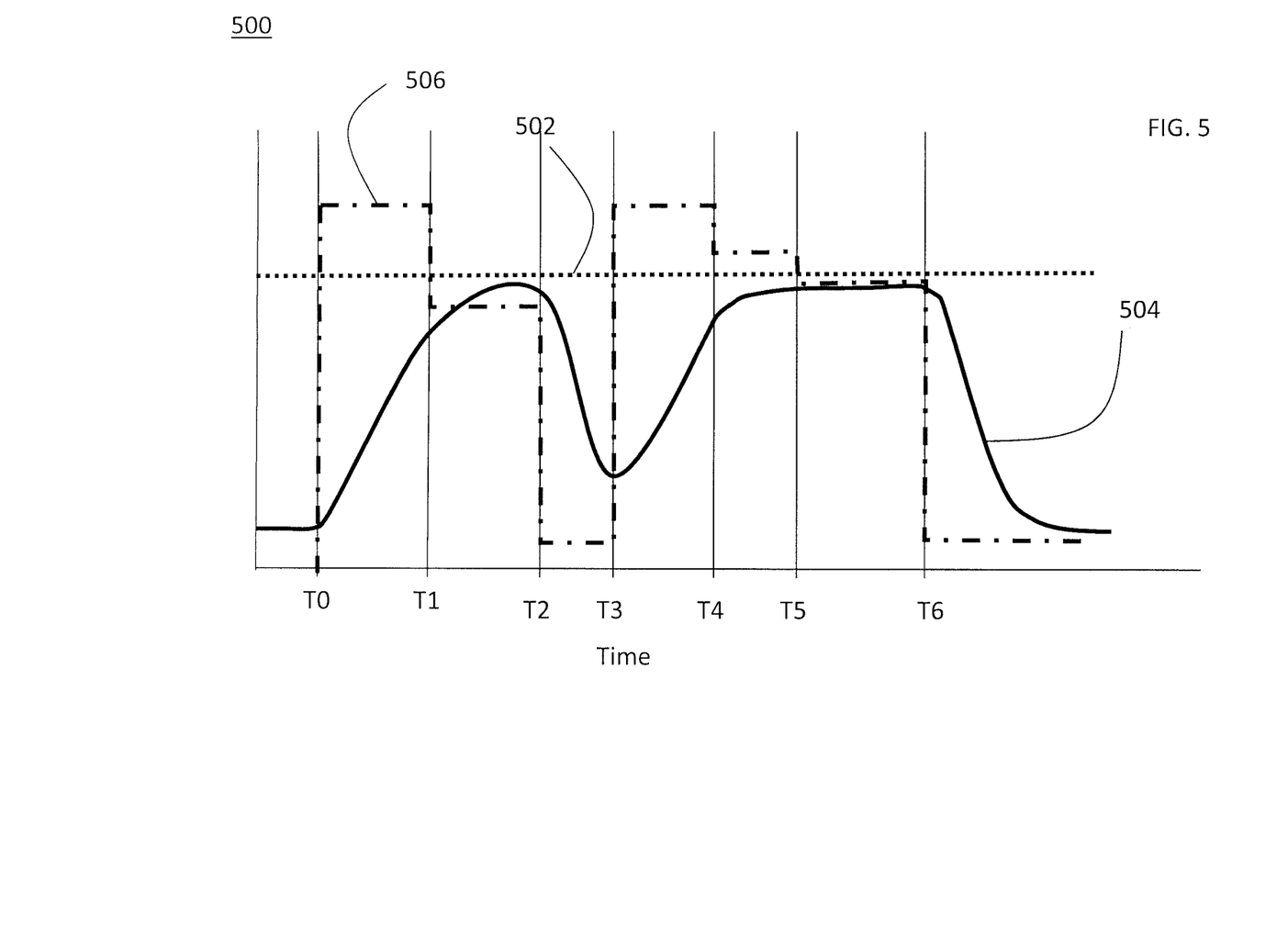
FIG. 5 depicts a second exemplary power waveform of an apparatus according to embodiments of the disclosure.

Illustrated in FIG. 5, is a graph 500 that includes an average power level per unit time 502 that has been determined to trip the circuit breaker associated with a power source. Accordingly, average power level per unit time 502 represent a threshold power level that cannot be exceeded, otherwise the circuit breaker will trip. Also illustrated on graph 500 are a calculated average power per unit time 504 as a function of time, and a waveform generated by, for example, waveform generator 208 of FIG. 2. The calculated average power per unit time 504 may be calculated based upon measurements made by, for example, a sensor of power monitor 210 of FIG. 2, and calculated using processing circuitry in conjunction with data and instructions stored in the memory devices, as discussed above. More specifically, the average power per unit time 504 may be calculated based upon voltage, amperage, heat, and/or other measurements known to those skilled in the art, taken from a powered device, such as a welding or cutting apparatus. Waveform 506 may represent, for example, the waveform of the power provided to the welding or cutting tool from a waveform generator, like waveform generator 208 of FIG. 2. As will be described below, waveform 506 is altered such that the calculated average power per unit time 504 does not exceed the average power per unit time 502 that will result in the tripping of a circuit breaker associated with the power source for the welding or cutting apparatus. In other words, the calculated average power per unit time 504 is compared with the average power level per unit time 502 that has been determined to trip the circuit breaker in order to determine how to alter waveform 506 to ensure that the circuit breaker is not tripped during operation of the powered device. The graph of FIG. 5 will be used to illustrate an embodiment of the smart power monitoring techniques of the present disclosure, though it should be understood that FIG. 5 and the illustrated values have not been drawn to scale.

As illustrated, at time T0, waveform 506 provides a relatively high power level to the welding or cutting apparatus. This power level may result in current being drawn through a circuit breaker that exceeds the rating for the circuit breaker. The calculated average power per unit time 504 increases in a relatively linear fashion. Because the calculated average power per unit time 504 approaches the average power per unit time 502 that will trip the circuit breaker, at time T1 the waveform 506 drops to a lower power level at time T1. This lower power level may cause the current drawn through the circuit breaker to match or be below the rating of the circuit breaker.

The specific time at which the power level drop takes place may be based on numerous factors. For example, in a normal welding or cutting operation, a user will only be welding or cutting for a short period of time. This period of time may be on the order of one minute. Accordingly, the determination as to when the power drop at time T1 is initiated may be based on numerous factors, including the duration between time T0 and T1, the rate of change of the calculated average power per unit time 504, the historical usage of the welding or cutting tool, and other factors known to those skilled in the art. According to one specific example, if waveform 506 has been at the high power level for a relatively long duration, a duration approaching the normal limit of a cutting or welding operation, and the rate of change of calculated average power per unit time 504 is relatively low, the smart power monitoring techniques of the present disclosure may delay the lowering of waveform 506 as it may be expected that the welding or cutting operation may complete prior to the calculated average power per unit time 504 exceeding the average power per unit time 502 that will result in the tripping of the circuit breaker. On the other hand, if the rate of change of the calculated average power per unit time 504 is high (i.e., the calculated value is rapidly approaching the average power per unit time 502 that will trip the circuit breaker), and the waveform 506 has only been at the high power level for a short period of time, the decrease in power level at time T1 may be made more quickly as the welding or cutting operation will be expected to last through the time that will bring the calculated average power per unit time 504 over the average per unit time 502 that will trip the circuit breaker.

At time T1, the waveform 506 is decreased, providing less power to the welding or cutting apparatus, but allowing the welding or cutting operation to complete at time T2, as illustrated by the large drop in waveform 506, representative of the user completing the cutting or welding operation. As also illustrated, between times T1 and T2, the calculated average power per unit time 504 reaches a maximum without exceeding the average power per unit time 502 that would have tripped the circuit breaker. The calculated average power per unit time then decreases as a result of the change in waveform 506 at time T1 and decreases even more rapidly due to the decrease in waveform 506 at time T2. Between times T1 and T2 the welding or cutting apparatus may experience a decrease in performance, but provides sufficient performance for the completion of the cutting or welding task at time T2.

Between times T2 and T3 no cutting or welding operation is taking place, but neither waveform 506 nor calculated average power per unit time 504 reaches zero. This may be because power is still utilized to power non-cutting and/or non-welding function of the apparatus and/or because some power is provided to the apparatus so that it may quickly begin cutting or welding again.

At time T3, a new welding or cutting operation is begun. Because the calculated average power per unit time 504 drops significantly between time T2 and T3, waveform 506 provides a high power level to the cutting or welding apparatus at time T3. Between times T3 and T4, the calculated average power per unit time 504 rises, approaching the average power per unit time 502 that will result in the tripping of the circuit breaker. Instead of immediately dropping the power level to a significantly lower level, waveform 506 drops slightly at time T4. This may be due to, for example, a low rate of change of the calculated average power per unit time 504 and a long duration between time T3 and T4, indicating that the cutting or welding task will complete prior to the calculated average power per unit time 504 exceeding the average power per unit time 502. While the calculated average power per unit time 504 continues to increase between time T4 and T5, the rate of change of the calculated average power per unit time 504 decreases. Because the welding or cutting operation continues, another drop in waveform 506 is made at time T5. This drop at time T5 allows the cutting or welding operation to complete at time T6 without the calculated average power per unit time 504 exceeding the average power per unit time 502. The drop at time T5 may be based on numerous considerations, including the time between T3 and T5, the rate of change of the calculated average power per unit time 504 between time T3 and T5, the rate of change of the calculated average power per unit time 504 between T3 and T4, the duration between T3 and T4, the duration between T4 and T5 and/or the duration between T3 and T5. Furthermore, the determination of when and how to drop the value of waveform 506 may be based upon, for example, known average values for cutting or welding tasks, tracked time for cutting or welding tasks for the particular apparatus, recent (i.e., daily, hourly) times for cutting or welding tasks, the average time between welding or cutting tasks, tracked time between cutting or welding tasks for the particular apparatus and/or recent (i.e., daily, hourly) times between cutting or welding tasks.

Techniques as described above with reference to FIGS. 4 and 5 may also be used in environments in which the voltage provided by a power source is inconsistent or in environments in which the power sources provides voltages below 120V, whether intentionally or not. For example, some locations with old or outdated electrical wiring or infrastructure provide power at less than 120V. Specifically, a power monitor, such as power monitor 210 of FIG. 2, may detect the voltage of a power source, such as power circuit 108. If the powered device is configured to operate with 120V and the power source is only providing, for example, 80-100V, the powered device will draw increased current from the power source, possible tripping the circuit breaker therein. By monitoring the voltage provided by the power source and the power usage by the powered device, techniques like those described above with reference to FIGS. 4 and 5 may be used to compensate for power sources providing less than 120V.

Figure 6:
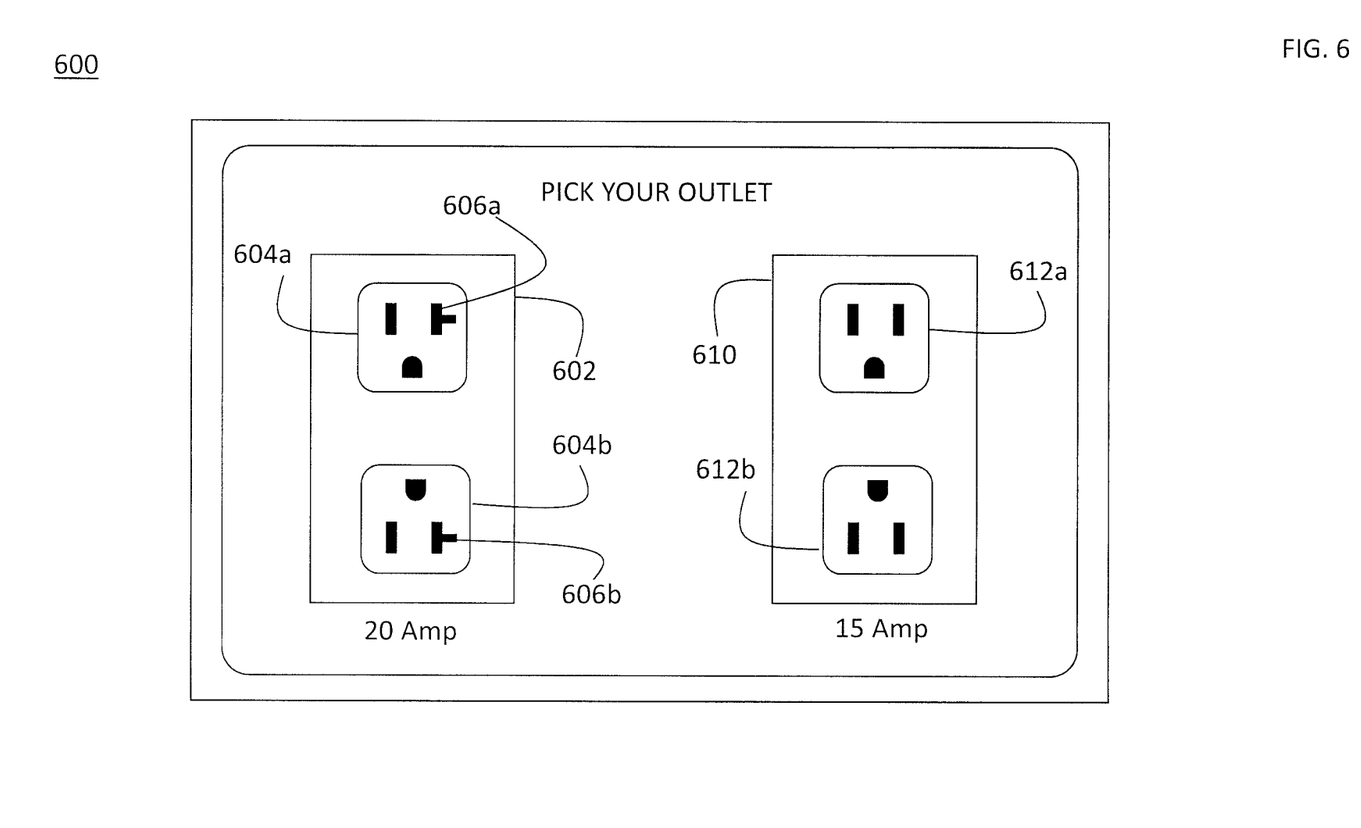
FIG. 6 depicts a first user interface according to an embodiment of the disclosure.

With reference now made to FIG. 6, depicted therein is a user interface 600 that is configured to allow a user to provide an indication to an apparatus, such as a welding or cutting apparatus, of the rating of the circuit breaker of the circuit from which the welding or cutting apparatus will draw power. User interface 600 may be important because it is difficult if not impossible for a device to determine the rating of a circuit breaker though which it is connected to a power source absent loading the circuit until the circuit breaker trips. Accordingly, one feature of the techniques described herein is the ability for a user to indicate the rating of the circuit breaker though which an apparatus is connected to a power source. The embodiment of FIG. 6 may be particularly advantageous as it allows a user to indicate the rating of the circuit breaker though which the apparatus is connected to a power source even if the user is unaware of the rating of the circuit breaker.

Specifically, user interface 600 leverages a feature of 120V outlets that allows a user to indicate the rating of the circuit breaker even if the user is unaware of the rating. User interface 600 provides images 602 and 610 of different 120V outlets—image 602 depicts 120V outlets 604a and 604b that are connected to a circuit with a 20 A circuit breaker while image 610 depicts outlets 612a and 612b that are connected to a circuit with a 15 A circuit breaker. As illustrated, outlets 604a and 604b are known to be connected to a 20 A circuit breaker due to the presence of "t-shaped" slots 606a and 606b. Outlets 612a and 612b are known to be connected to a 15 A circuit breaker due to the absence of such t-shaped slots. Accordingly, by presenting the user with images 602 and 610, the user may provide the apparatus with an indication of the rating of the circuit breaker through which the apparatus will be powered even if the user is not independently aware of the circuit breaker rating.

When user interface 600 is embodied as a touch screen device, images 602 and 610 may be embodied as functional portions of the touchscreen 600. Accordingly, users may be able to indicate the rating of the circuit breaker through which the apparatus will be powered by simply touching the image that represents the outlet through which the apparatus receives power.

Figure 7:
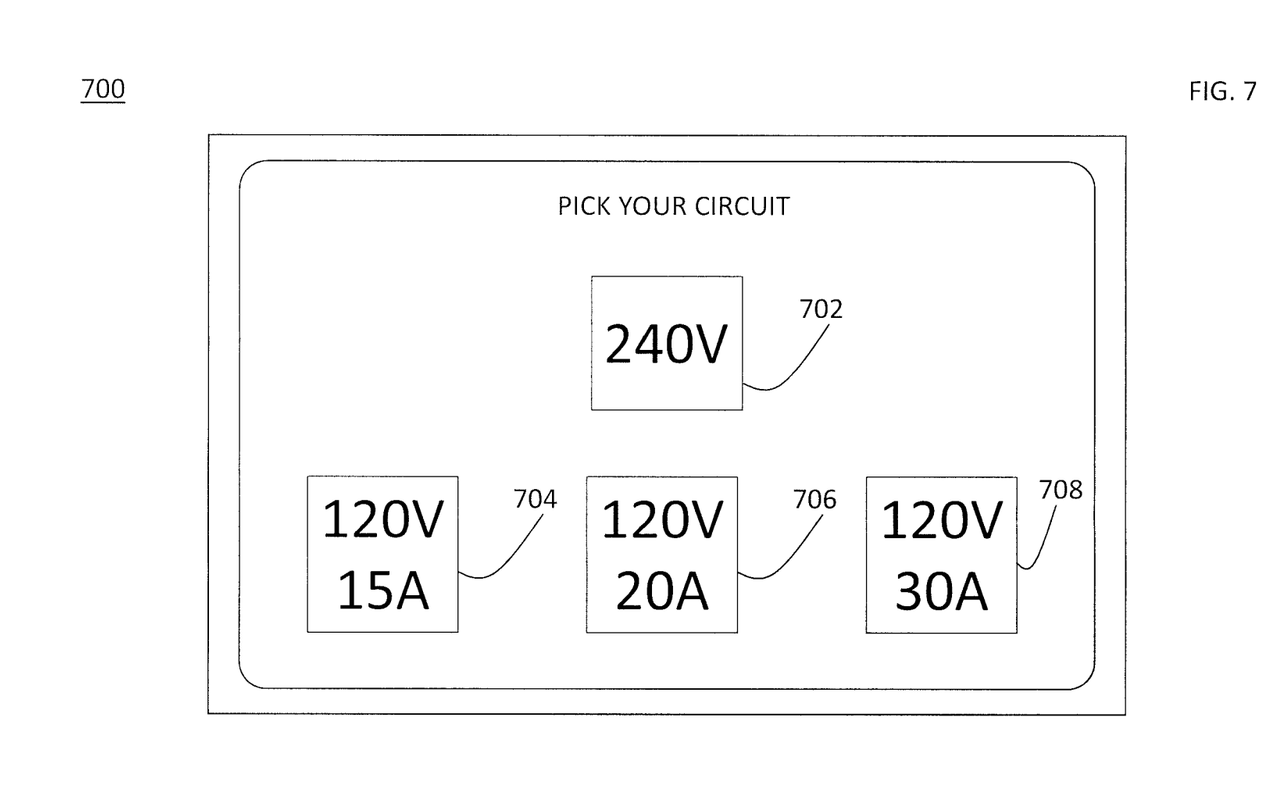
FIG. 7 depicts a second user interface according to an embodiment of the disclosure.

With reference now made to FIG. 7, depicted therein is a user interface 700 that allows a user to indicate the rating of the circuit breaker though which an apparatus is connected to a power source when the user is aware of the rating of the circuit breaker via which the apparatus receives power. As with user interface 600, user interface 700 may be embodied as a touch screen, allowing a user to simply touch functional areas 702-708 to indicate the voltage and rating of the circuit breaker of the circuit via which the apparatus receives power. Because it is possible to detect the voltage the circuit to which an apparatus if connected, functional area 702 may be omitted from user interface 700, and user interface may only be presented to the user when a 120V circuit is detected.

Figure 8:
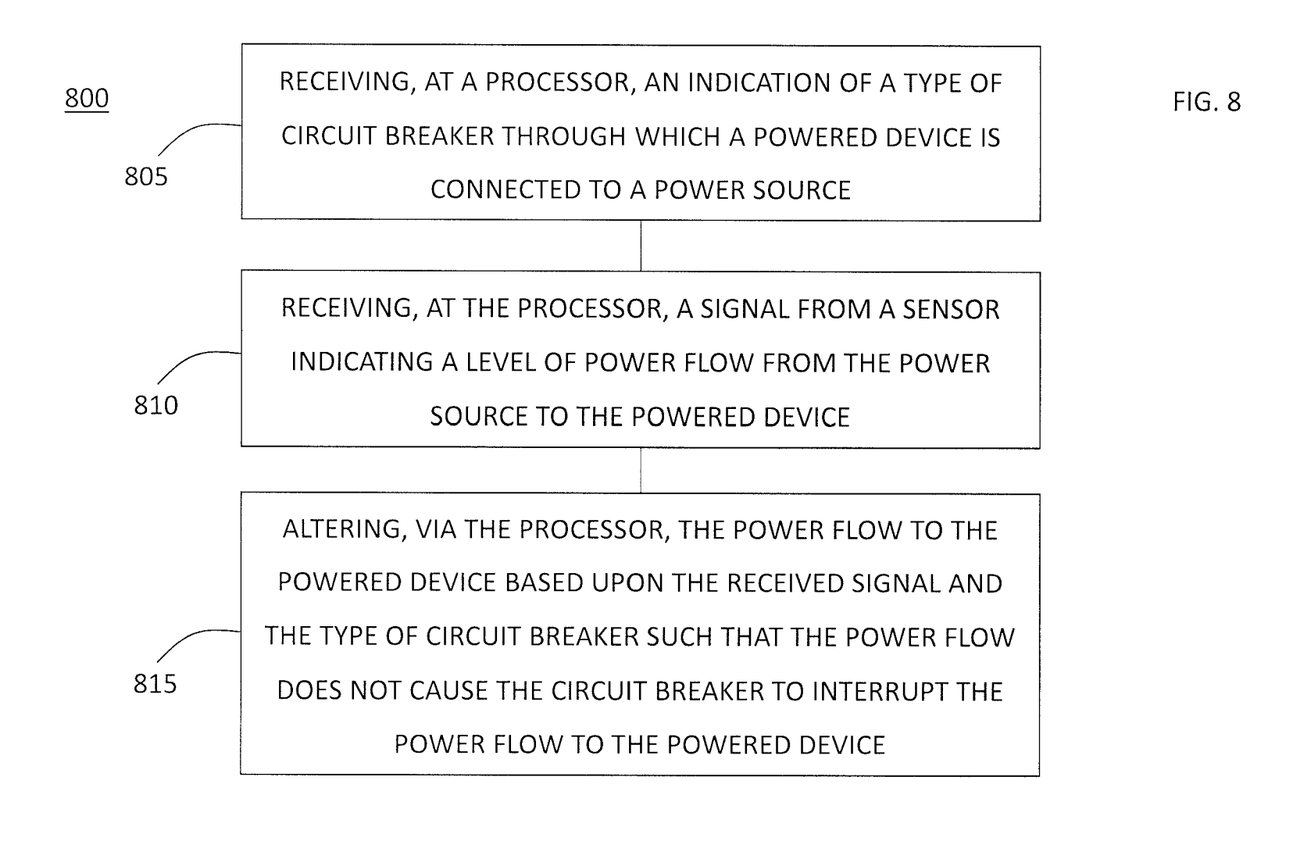
FIG. 8 depicts a flowchart illustrating a process for providing smart power monitoring according to an embodiment of the disclosure.

With reference now made to FIG. 8, depicted therein is a flowchart 800 illustrating a process for providing smart power monitoring according to the techniques described herein. The process begins in operation 805 in which an indication is received at a processor. The indication indicates the type of circuit breaker though which a powered device is connected to a power source. For example, the indication may be a user indication which is received through a user interface. More specifically, the user interface may be embodied as illustrated in FIG. 6 and/or FIG. 7 of the present disclosure. This indication may be received at, for example, a processor of a waveform generator of the powered device that determines the power level to be provided to the powered device, an example of which is waveform generator 208 of FIG. 2, above. According to other example embodiments, the processor may be included in, for example, a power monitor of the powered device, such as processor 216 of power monitor 210 of FIG. 2.

In operation 810, a signal is received at the processor from a sensor. The signal indicates a level of power from the power source to the powered device. For example, the sensor may measure one or more of voltage, amperage, heat, and/or other measurements known to those skilled in the art that would be indicative of power that the powered device is receiving from the power source through the circuit breaker. For example, the sensor may be embodied as power monitor 210 of FIG. 2 that provides a signal to waveform generator 208 when the processor is contained within waveform generator 208. According to other example embodiments the processor may be incorporated into power monitor 210 of FIG. 2, and therefore, the signal is received at the processor from a sensor also incorporated into power monitor 210.

Finally, in operation 815, the power flow to the powered device is altered by the processor based upon the received signal and the type of circuit breaker such that the power flow does not cause the circuit breaker to interrupt the power flow to the powered device. For example, operation 815 may be embodied as a waveform generator altering the power provided to a powered device as described above with reference to FIGS. 4 and 5, above.

The present embodiments provide advantages over known welding apparatus. For example, known apparatuses may simply hardcode the welder to work at 15 A or 20 A without accounting for actual amperage ratings. In such known apparatus, when operating with a 30 A circuit breaker, merely providing welding power at a constant level not exceeding effective current of 15 A may decrease performance below what is possible, while operating at a constant effective current level of 20 A will trip a circuit breaker having an amperage rating of 15 A.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below should be construed in view of the full breadth and spirit of the present disclosure as described herein.

What is claimed is:

1. A method comprising:
    receiving, at a processor, via a user interface, an indication of an amperage rating, selected from a plurality of presented ratings in the form of images of electrical outlets, of a circuit breaker through which a powered device is connected to a power source;
    receiving, at the processor, a signal from a sensor indicating a level of power flow from the power source to the powered device;
    altering, via the processor, the power flow to the powered device based upon the received signal and the amperage rating of the circuit breaker such that the power flow does not cause the circuit breaker to interrupt the power flow to the powered device.

2. The method of claim 1, wherein the powered device comprises a welding device.

3. The method of claim 1, wherein altering the power flow to the powered device comprises:
    determining, via the processor, an average of the power flow from the signal; and
    comparing the average of the power flow to a predetermined value associated with the circuit breaker.

4. The method of claim 1, wherein altering the power flow to the powered device comprises drawing current through the circuit breaker that exceeds a current rating of the circuit breaker for a period of time insufficient to trip the circuit breaker.

5. The method of claim 1, further comprising determining, via the processor, a threshold power flow through the circuit breaker over a period of time that will cause the circuit breaker to interrupt the power flow to the powered device from the indication, and
    wherein altering the power flow to the powered device such that an average power flow to the powered device over the period of time does not exceed the threshold power flow through the circuit breaker.

6. The method of claim 1, wherein receiving the signal comprises receiving a signal indicating one or more of a voltage, an amperage, an instantaneous level of the power flow, an average level of the power flow, and/or a rate of change of the power flow.

7. An apparatus comprising:
    a sensor;
    a powered device, and
    one or more processors communicatively connected to the sensor and the powered device, wherein the one or more processors are configured to:
    receive via a user interface, an indication of an amperage rating, selected from a plurality of presented ratings in the form of images of electrical outlets, of a circuit breaker through which the powered device is connected to a power source;
    receive a signal from the sensor indicating a level of power flow from the power source to the powered device;
    alter the power flow to the powered device based upon the received signal and the amperage rating of the circuit breaker such that the power flow does not cause the circuit breaker to interrupt the power flow to the powered device.

8. The apparatus of claim 7, wherein the powered device comprises a welding device.

9. The apparatus of claim 7, wherein the one or more processors are configured to alter the power flow to the powered device by:
    determining an average of the power flow from the signal; and
    comparing the average of the power flow to a predetermined value associated with the circuit breaker.

10. The apparatus of claim 7, wherein the processor is configured to alter the power flow to the powered device by drawing current through the circuit breaker that exceeds a current rating of the circuit breaker for a period of time insufficient to trip the circuit breaker.

11. The apparatus of claim 7, wherein the one or more processors are configured to determine from the indication a threshold power flow through the circuit breaker over a period of time that will cause the circuit breaker to interrupt the power flow to the powered device, and
    wherein the one or more processors are configured to alter the power flow to the powered device such that an average power flow to the powered device over the period of time does not exceed the threshold power flow through the circuit breaker over the period of time.

12. The apparatus of claim 7, wherein the signal comprises one or more of a voltage, an amperage, an instantaneous level of the power flow, an average level of the power flow, and/or a rate of change of the power flow.

13. A tangible, non-transitory computer readable storage medium encoded with instructions that when executed cause one or more processors to:
    receive via a user interface, an indication of an amperage rating, selected from a plurality of presented ratings in the form of images of electrical outlets, of a circuit breaker through which a powered device is connected to a power source;
    receive a signal from a sensor indicating a level of power flow from the power source to the powered device;
    alter the power flow to the powered device based upon the received signal and the amperage rating of the circuit breaker such that the power flow does not cause the circuit breaker to interrupt the power flow to the powered device.

14. The computer readable storage medium of claim 13, wherein the powered device comprises a welding device.

15. The computer readable storage medium of claim 13, wherein the instructions cause the one or more processors to alter the power flow to the powered device by:
    determining, via the processor, an average of the power flow from the signal; and
    comparing the average of the power flow to a predetermined value associated with the circuit breaker.

16. The computer readable storage medium of claim 13, wherein the instructions further cause the one or more processors to determine a threshold power flow through the circuit breaker over a period of time that will cause the circuit breaker to interrupt the power flow to the powered device from the indication, and
    wherein the instructions cause the one or more processors to alter the power flow to the powered device such that an average power flow to the powered device over the period of time does not exceed the threshold power flow through the circuit breaker.

17. The computer readable storage medium of claim 13, wherein the instructions cause the one or more processors to receive the signal by receiving a signal indicating one or more of a voltage, an amperage, an instantaneous level of the power flow, an average level of the power flow, and/or a rate of change of the power flow.

* * * * *